(12) United States Patent
Nakagawa et al.

(10) Patent No.: US 8,606,089 B2
(45) Date of Patent: Dec. 10, 2013

(54) REPRODUCTION CONTROLLER, AND REPRODUCTION CONTROLLING METHOD AND PROGRAM

(75) Inventors: Takayuki Nakagawa, Kanagawa (JP); Shin Kimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 1365 days.

(21) Appl. No.: 10/634,102

(22) Filed: Aug. 4, 2003

(65) Prior Publication Data

US 2004/0028383 A1    Feb. 12, 2004

(30) Foreign Application Priority Data

Aug. 5, 2002 (JP) ................ P2002-227749

(51) Int. Cl.
*H04N 5/783* (2006.01)
(52) U.S. Cl.
USPC .......................................................... 386/344
(58) Field of Classification Search
USPC ...................................................... 386/68, 95
See application file for complete search history.

(56) References Cited

U.S. PATENT DOCUMENTS

| | | | | |
|---|---|---|---|---|
| 4,567,534 | A * | 1/1986 | Groen et al. ................... | 386/273 |
| 5,398,224 | A * | 3/1995 | Takahashi ................... | 369/44.28 |
| 6,959,141 | B1 * | 10/2005 | Ichikawa et al. .............. | 386/353 |
| 7,095,951 | B2 * | 8/2006 | Moriyama et al. ............. | 386/241 |
| 7,106,946 | B1 * | 9/2006 | Kato .............................. | 386/241 |
| 7,178,106 | B2 * | 2/2007 | Lamkin et al. ................. | 715/716 |
| 2002/0044757 | A1 * | 4/2002 | Kawamura et al. ............. | 386/46 |
| 2002/0110366 | A1 * | 8/2002 | Cho ................................ | 386/96 |
| 2002/0126992 | A1 * | 9/2002 | Sakuramoto .................... | 386/77 |
| 2002/0131761 | A1 * | 9/2002 | Kawasaki et al. ............... | 386/65 |
| 2003/0077071 | A1 * | 4/2003 | Lin et al. ......................... | 386/68 |

\* cited by examiner

*Primary Examiner* — Christopher S Kelley
*Assistant Examiner* — Christopher Findley
(74) *Attorney, Agent, or Firm* — Frommer Lawrence & Haug LLP; William S. Frommer; Ellen Marcie Emas

(57) ABSTRACT

A drive unit supplies to an auxiliary information generating section a first event notice related to reproducing operation and a second event notice indicating reproducing position information, regarding content recorded on a recording medium. The auxiliary information generating section generates auxiliary information based on the first and second event notices, for storage in an information storage section. A comparison/computation section makes a comparison or a computation using the reproducing position information indicated by the auxiliary information and reproducing position information indicated by a later-supplied second event notice. A command issuing section issues a command for controlling reproduction of the content based on a result of the comparison or the computation. As a result, a reproducing operation differing from an operation according to a predetermined command can be performed.

17 Claims, 5 Drawing Sheets

FIG. 3

REPRODUCTION CONTROLLER, AND REPRODUCTION CONTROLLING METHOD AND PROGRAM

CROSS REFERENCE TO RELATED APPLICATIONS

The present document is based on Japanese Priority Application JP2002-227749, filed in the Japanese Patent Office on Aug. 5, 2002, the contents of which being incorporated herein by reference to the extent permitted by law.

BACKGROUND OF THE INVENTION

1. Field of the Invention

The present invention relates to a reproduction controller, and a reproduction controlling method and program. More particularly, the invention is intended to generate auxiliary information based on a first event notice related to reproducing operation regarding content recorded on a recording medium and a second event notice indicating reproducing position information on the recording medium, and then to issue a command for controlling reproduction of the content based on the result of a comparison or a computation made on the auxiliary information and reproducing position information indicated by a later-supplied second event notice.

2. Description of the Related Art

Conventionally, in order to reproduce content recorded on a recording medium, such as, for example, a disk compatible with a DVD-Video standard, a desired command is selected from among predetermined commands and issued to a drive unit, whereby to play the recording medium. For example, when a "Play" command is issued, a current title may be reproduced. When a "PlayChapter(parameter)" command is issued, a chapter specified by the parameter of the current title is reproduced. When a "PlayNextChapter" command is issued, reproduction of a next chapter is started, and when a "PlayPrevChapter" command is issued, reproduction of a chapter immediately before a current chapter is started. Also, when a "PlayAtTime(parameter)" command is issued, reproduction of the content is started at a time specified by the parameter of the current title. It is further arranged to issue a command such as to reproduce a specified title.

On the other hand, the drive unit supplies predetermined event notices indicating information related to reproducing operation and information related to reproducing positions regarding the content recorded on the recording medium. For example, when an event notice "EC_DVD_CHAPTER_START(parameter)" is supplied, it is indicated that reproduction of the chapter specified by the parameter of the current title is started. Also, in an event notice "EC_DVD_CURRENT_HMSF_TIME(parameter)", reproducing position information (a time code) is indicated by the parameter, whereas an event notice "EC_DVD_DISC_INSERTED" or "EC_DVD_DISC_EJECTED" indicates that the disc is inserted into or ejected from a reproducing apparatus.

It is worth a note that, since the commands as mentioned above are pre-set, the reproducing operations utilizing such commands are limited. For example, when any of the "PlayChapter(parameter)", "PlayNextChapter", and "PlayPrevChapter" commands is used, the command can only move the reproducing position by the chapter, when issued. Also, when the "PlayAtTime(parameter)" command is issued, Also, when the "PlayAtTime(parameter)" command is issued, the content can be reproduced only from a position specified by the parameter.

Additionally, the disc contains various management information so as to play DVD-Video compatible content properly. However, the event notices are pre-set and thus so limited that this management information cannot be read.

Consequently, there is an issue in which mere issuance of a limited number of predetermined commands according to user's operation, and non-utilization of the management information constitutes a barrier for implementation of a more diversified and elaborate reproducing operation.

SUMMARY OF THE INVENTION

In order to alleviate the above mentioned problems, the present invention provides a reproduction controller, and a reproduction controlling method and program, which can implement a variety of reproducing functions by using predetermined commands and event notices supplied by the drive unit.

A reproduction controlling apparatus according to a preferred embodiment of the present invention includes: auxiliary information generation means for generating auxiliary information based on a first event notice related to reproduction operation regarding content recorded in a recording medium and a second event notice indicating reproduction position information of the recording medium; comparison-computation means for comparing or computing reproduction position information indicated by the auxiliary information with reproduction position information indicated by the second event notice; and command issuing means for issuing a command for controlling reproduction operation of the content, based on a result of the comparison or the computation.

In addition a reproduction controlling method according to another preferred embodiment of the present invention includes the steps of generating auxiliary information based on a first event notice related to reproduction operation regarding content recorded in a recording medium and a second event notice indicating reproduction position information of the recording medium; and issuing a command for controlling reproduction operation of the content, based on a result of comparison or computation of reproduction position information indicated by the auxiliary information with reproduction position information indicated by the second event notice.

Furthermore, a computer program written in computer readable form for reproduction controlling according to another preferred embodiment of the present invention has program codes for causing a computer to execute the steps of: acquiring a first event notice related to reproduction operation regarding content recorded in a recording; acquiring a second event notice indicating reproduction position information of the recording medium; generating auxiliary information based on the first event notice and the second event notice; and issuing a command for controlling reproduction operation of the content, based on a result of comparison or computation of reproduction position information indicated by the auxiliary information with reproduction position information indicated by the second event notice.

According to the preferred embodiments of the present invention, auxiliary information is generated based on a first event notice related to reproducing operation and a second event notice indicating reproducing position information, regarding content recorded on a recording medium, and a command for controlling the content reproducing operation is issued based on the result of a comparison or a computation performed on the reproducing position information indicated by the auxiliary information and reproducing position information indicated by a later-supplied second event notice, whereby not only operations according to predetermined commands, but also diverse reproducing operation can be performed.

Furthermore, the generated auxiliary information is stored, and thereafter read to use the reproducing position information in the read auxiliary information for comparison or computation, whereby further diverse reproducing operation can be performed.

Furthermore, the first event notice notifies the reproduction start of a content block constituting the content, whereas the auxiliary information is generated based on the content block, reproduction of which has been started, and the reproducing position information at the time of its reproduction, whereby a reproducing operation can be performed in which the reproduction starting position of this content block is used as a reference. For example, when reproducing position information indicated by a second event notice is a predetermined time ahead of the reproducing position information indicated by the auxiliary information, a command is issued to change content blocks for reproduction, whereby the skip function can be implemented.

Moreover, when a command issuing operation is performed for controlling the content reproducing operation, such command is issued after converted or adjusted based on the result of a comparison or a computation, whereby conventional command functions can be expanded.

BRIEF DESCRIPTION OF THE DRAWINGS

The above and other features and advantages of the present invention will become more apparent from the following description of the presently exemplary preferred embodiment of the present invention taken in conjunction with the accompanying drawings, in which.

DESCRIPTION OF THE PREFERRED
EMBODIMENTS OF THE INVENTION

Figure 1:
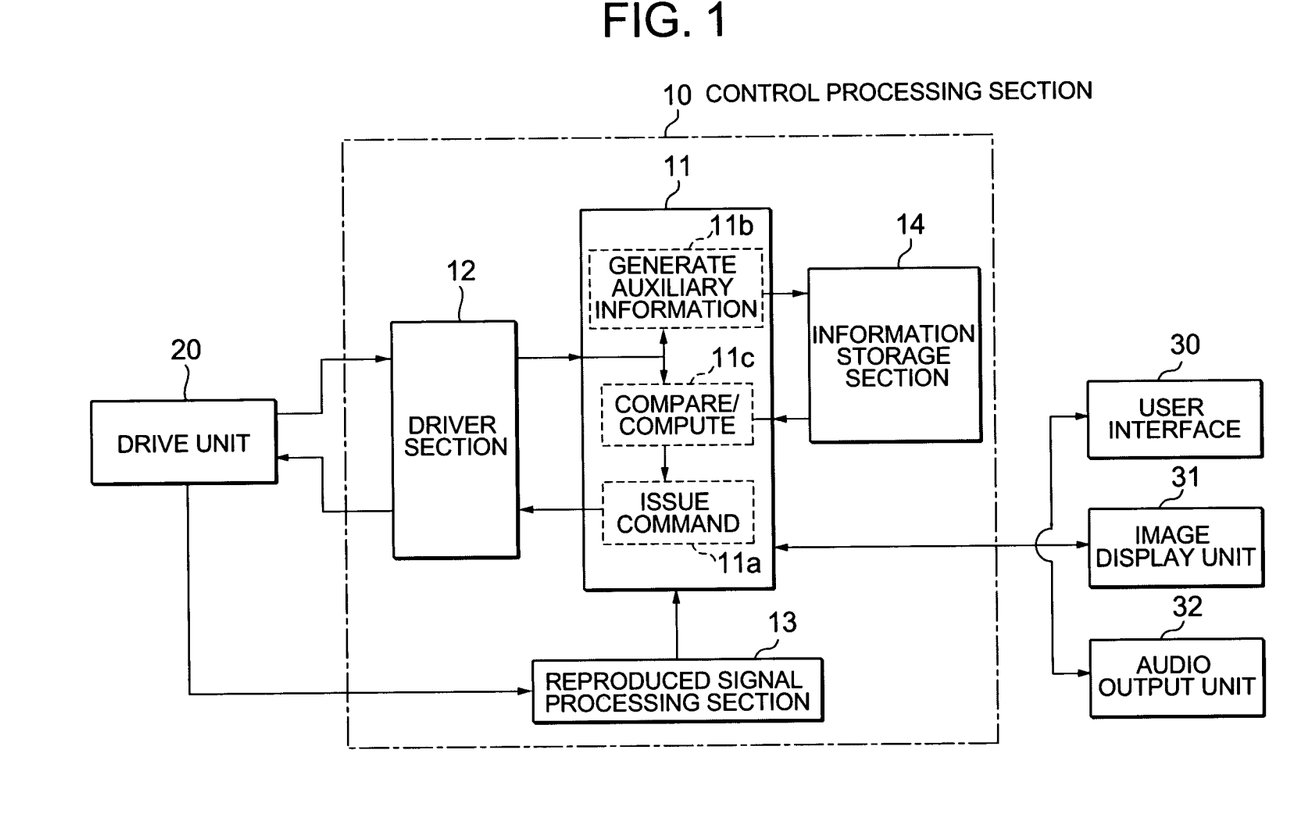
FIG. 1 is a diagram showing a content reproducing system according to a preferred embodiment of the present invention.

An embodiment of the present invention will be described with reference to the attached drawings. FIG. 1 shows a general configuration of a content reproducing system that reproduces content recorded on a recording medium, such as, for example, a DVD-Video compatible disk.

A control processing section 11 of a reproduction controller 10 has connected to it a user interface 30 that inputs signals according to operation by a user. The interface 30 includes a keyboard, a mouse, a touch panel, and remote control signal receiving circuitry. A command issuing section 11a of the control processing section 11 issues commands based on manipulated signals, when receiving the manipulated signals corresponding to command input operation performed by the user via the user interface 30.

A command issued by the command issuing section 11a is supplied to a drive unit 20 via a driver section 12. The driver section 12 converts the issued command into a signal acceptable by the drive unit 20. Thus, even when the drive unit 20 is changed to a different type, if a driver section 12 compatible with the changed drive unit 20 is provided, the existing commands issued from the command issuing section 11a can be performed by the changed drive unit 20, with no change or modification made on these commands.

The drive unit 20 reproduces image and/or audio content based on the supplied command, and delivers a signal read from the disc to a reproduced signal processing section 13. The drive unit 20 also feeds event notices indicative of information related to reproducing operation and reproducing positions for the content, to the control processing section 11 via the driver section 12.

The reproduced signal processing section 13 decodes the supplied image and/or audio data, and outputs the decoded image and/or audio data to an image display unit 31 and/or an audio output unit 32 via the control processing section 11. The image display unit 31 presents the image content based on the image data supplied. The audio output unit 32 presents the audio content based on the audio data.

An auxiliary information generating section 11b of the control processing section 11 generates auxiliary information using the event notices from the drive unit 20, and stores the generated auxiliary information in an information storage section 14. Also, in order to read the generated but not yet stored auxiliary information, or all or some desired items of stored auxiliary information, a comparison/computation section 11c compares or computes reproducing position information contained in the auxiliary information and reproducing position information supplied by a specific event notice. Based on a comparison or computation result, the command issuing section 11a automatically issues a corresponding command to the drive unit 20.

Figure 2:
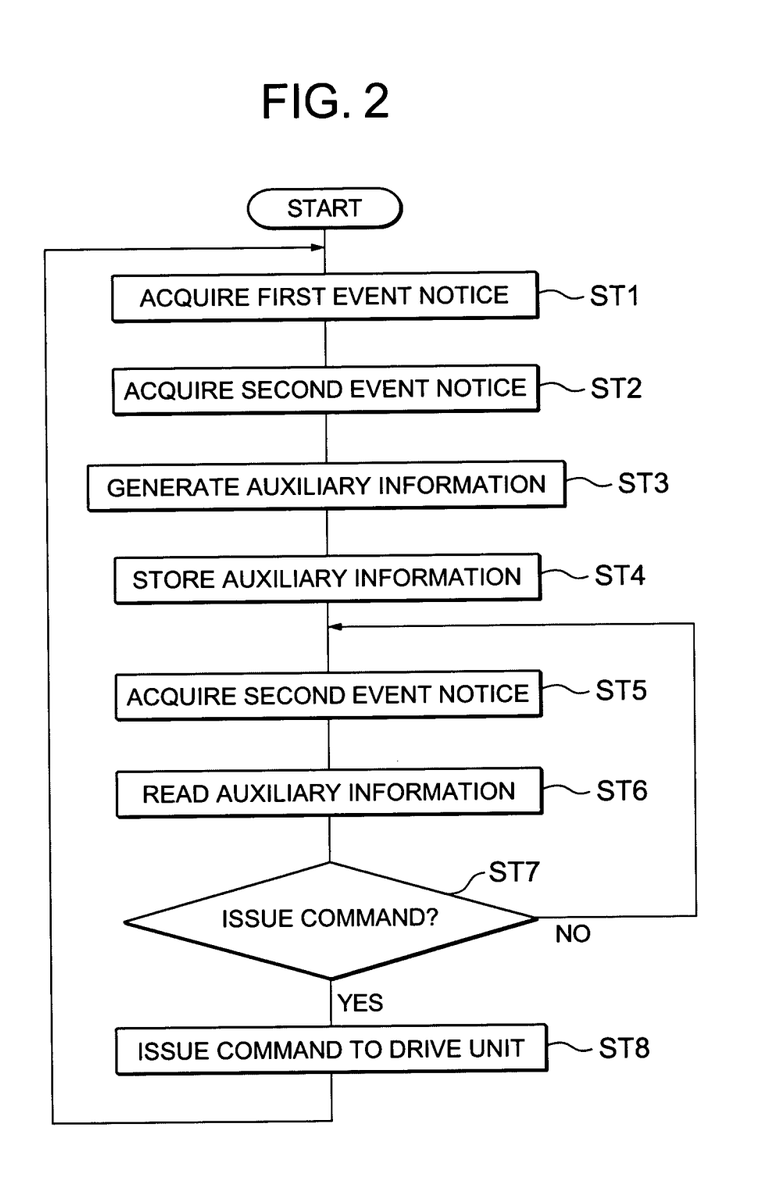
FIG. 2 is a flowchart showing an operation performed by a control processing section according to a preferred embodiment of the present invention.

FIG. 2 is a flowchart showing an operation performed by the control processing section 11. In step ST1, the control processing section 11 acquires from the drive unit 20 a first event notice indicating information related to reproducing operation for content, and then, in step ST2, a second event notice indicating reproducing position information is acquired. In step ST3, auxiliary information indicating a relationship between a content block that constitutes a content and its reproducing position is generated based on the event notices acquired in steps ST1 and ST2.

In step ST4, the control processing section 11 stores the auxiliary information generated in step ST3 in the information storage section 14, and then goes to step ST5, in which a second event notice from the drive unit 20, which indicates reproducing position information, is acquired. Then, in step ST6, the auxiliary information from the information storage section 14 is read out, and the process proceeds to step ST7.

In step ST7, the control processing section 11 performs a comparison or a computation between or on the reproducing position information indicated by the second event notice acquired in step ST5 and the position information contained in the auxiliary information read in step ST6, to determine whether or not a command should be issued based on a comparison or computation result. If it is determined not to issue a command, the control processing section 11 loops back to step ST5; otherwise it goes to step ST8, where it issues a command to the drive unit 20 and then returns to step ST1.

The above operation of FIG. 2 will be described more specifically with reference to FIG. 3 that shows an example of a skip function. In the skip function, auxiliary information indicating a relationship between a content block constituting content, for example, a chapter, and its starting position is generated, and by using such auxiliary information, each chapter, is sequentially and automatically reproduced (played) from its beginning for only a predetermined time.

Figure 3:
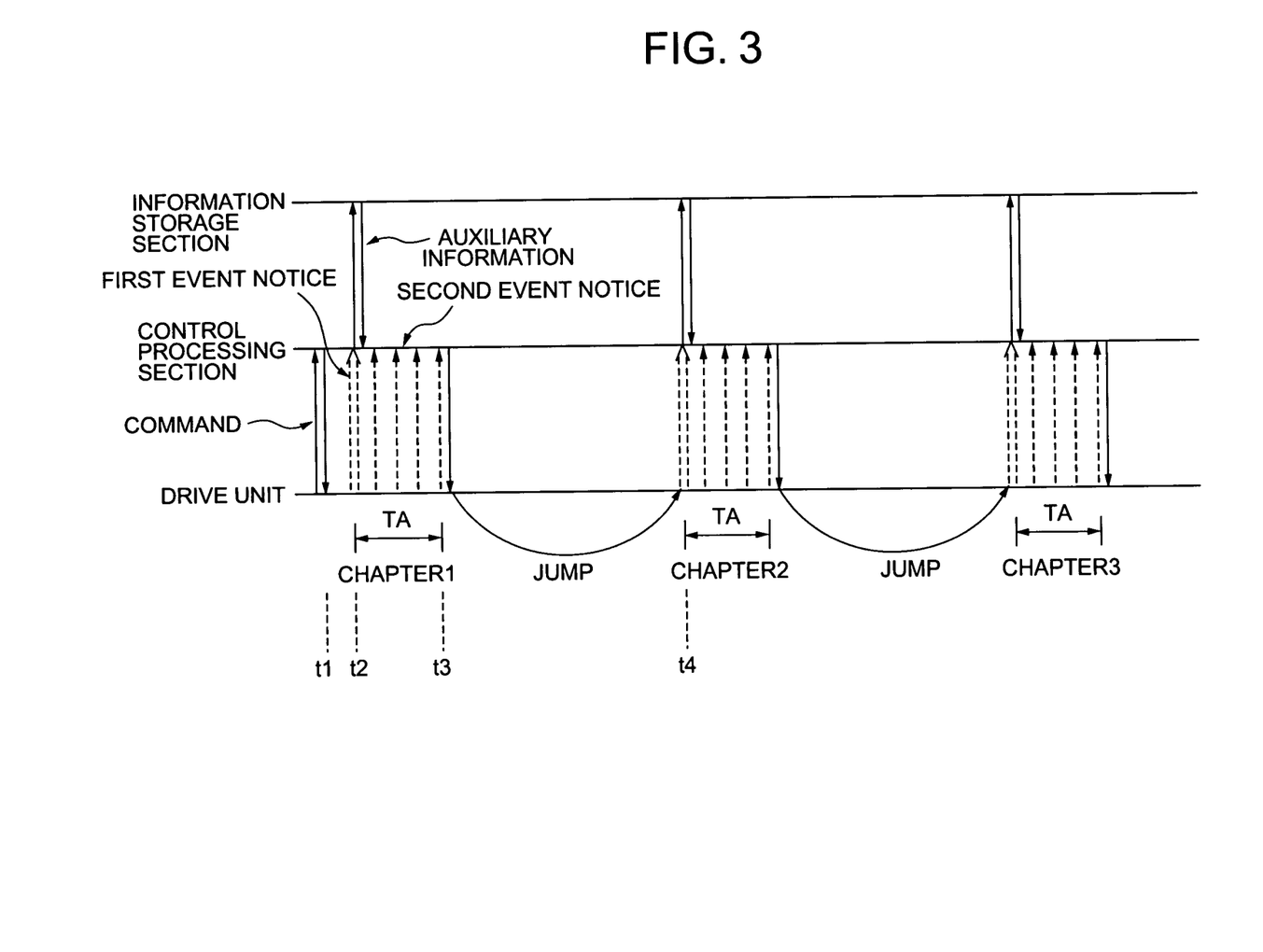
FIG. 3 is a diagram for illustrating operation of a skip function.

When the skip function is selected, first, the command issuing section 11a of the control processing section 11 issues to the drive unit 20 a "Play" command at a time t1 in FIG. 3. The drive unit 20 then starts reproducing a chapter 1, which is a first chapter, in a title 1. The drive unit 20 also outputs an event notice "EC_DVD_CHAPTER_START" indicating the reproduction start of the chapter 1, at a time t2 at which the reproduction is started. It further starts outputting event notices "EC_DVD_CURRENT_HMSF_TIME" as the reproduction is started. Each event notice "EC_DVD_CURRENT_HMSF_TIME" outputs as reproducing position information, a current time measured from the starting time of the title as a reference. This event notice is outputted at the beginning of every VOBU (Video Object Unit) that is generated every 0.4 to 1 seconds. The reproducing position information includes a time code "time, minute, second, frame".

The control processing section 11 acquires the event notice "EC_DVD_CHAPTER_START" in step ST1 and a first one of the event notices "EC_DVD_CURRENT_HMSF_TIME" in step ST2, of FIG. 2. Then, in step ST3, auxiliary information is generated by relating the chapter 1 to the reproducing position information indicating the beginning position of the chapter 1, based on these event notices received in steps ST1 and ST2. In step ST4, the generated auxiliary information is stored in the information storage section 14.

Thereafter, in step ST5, the control processing section 11 acquires reproducing position information indicative of a current reproducing position based on a later supplied event notice "EC_DVD_CURRENT_HMSF_TIME", and then in step ST6, reads the auxiliary information from the information storage section 14. In step ST7, the information indicated by the auxiliary information is subtracted from the reproducing position information acquired in step ST5, to determine whether the reproducing time for the chapter 1 exceeds a predetermined time TA or not. If not, the control processing section 11 loops back to step ST5. Otherwise, or if a time t3 is reached upon lapse of the predetermined time TA, then the control processing section 11 goes to step ST8 where it issues a "PlayNextChapter" command for reproducing a next chapter, and returns to step ST1. It should be noted that in step ST5, a reference value obtained by adding a predetermined time to the position information indicated by the auxiliary information may be set, and that this reference value may be compared with the reproducing position information indicated by the event notice to issue a command based on a comparison result.

Then, based on the "PlayNextChapter" command, the drive unit 20 moves the reproducing position to a chapter 2. When starting reproduction of the chapter 2 at a time t4, the drive unit 20 outputs an event notice "EC_DVD_CHAPTER_START" indicating that reproduction of the chapter is started.

The control processing section 11 acquires the event notice "EC_DVD_CHAPTER_START" in step ST1 and an event notice "EC_DVD_CURRENT_HMSF_TIME" in step ST2. Then, in step ST3, the chapter 2 is associated to the reproducing position information indicating its beginning, to generate auxiliary information for storage in the information storage section 14. Thereafter, processing similar to that for the chapter 1 is performed, whereby the chapter 2 is reproduced for the predetermined time TA, and the reproducing position can be jumped to a chapter 3.

In this way, the predetermined commands and the event notices supplied from the drive unit can be utilized to realize the skip function by which content can be reproduced automatically from the beginning of one chapter to another for the predetermined time TA.

While the above operation has been described as an example of implementation of the skip function, the functions of predetermined commands may be expanded by issuing the commands as converted or adjusted based on comparison or computation results. For example, when a "PlayPrevChapter" command is issued, the reproducing position is moved back to the beginning of a chapter that is one chapter before a chapter currently being reproduced in the conventional scheme. However, by generating auxiliary information and converting or adjusting the "PlayPrevChapter" command using this auxiliary information, the function of the "PlayPrevChapter" command can be expanded.

Figure 4:
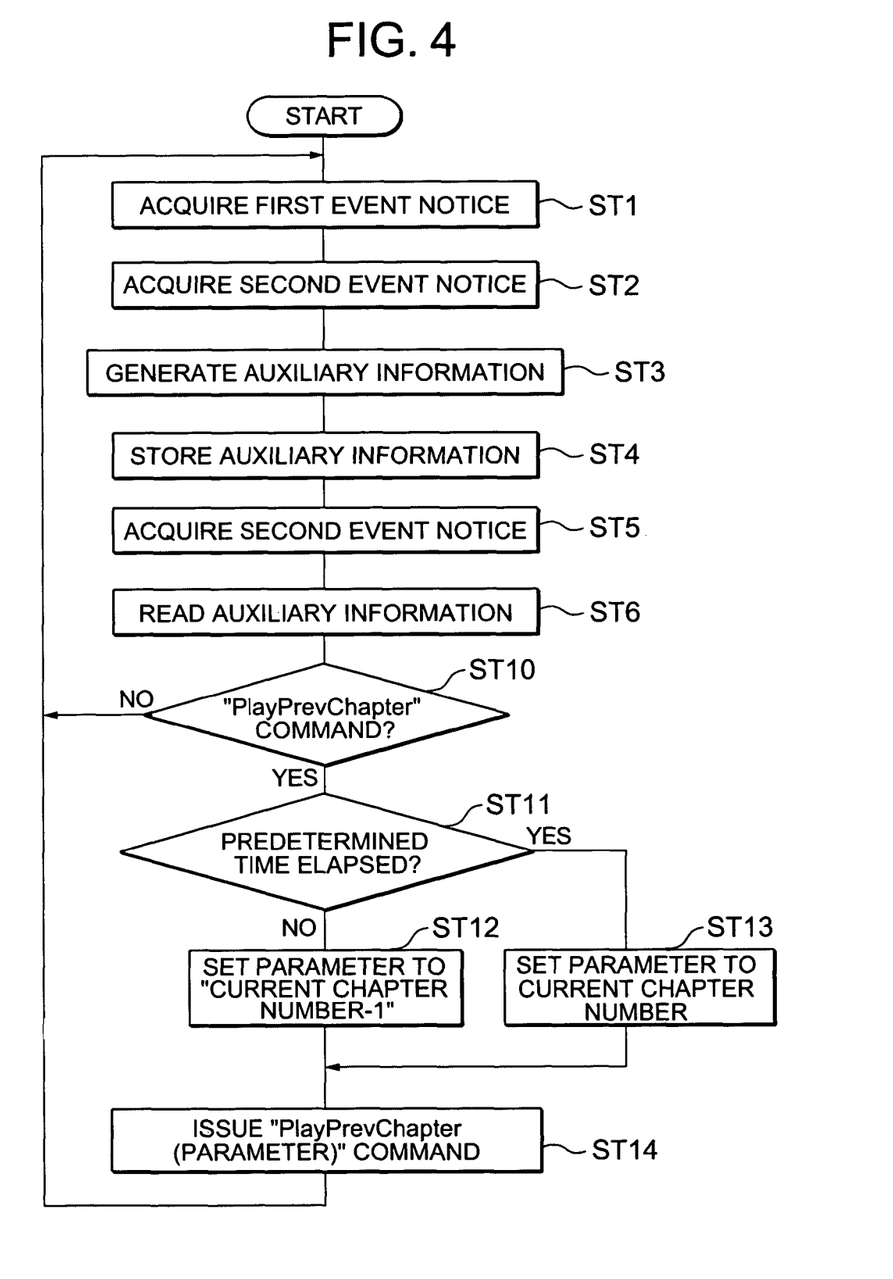
FIG. 4 is a flowchart showing operation performed to expand a "PlayPrevChapter" command function.
Figure 5:
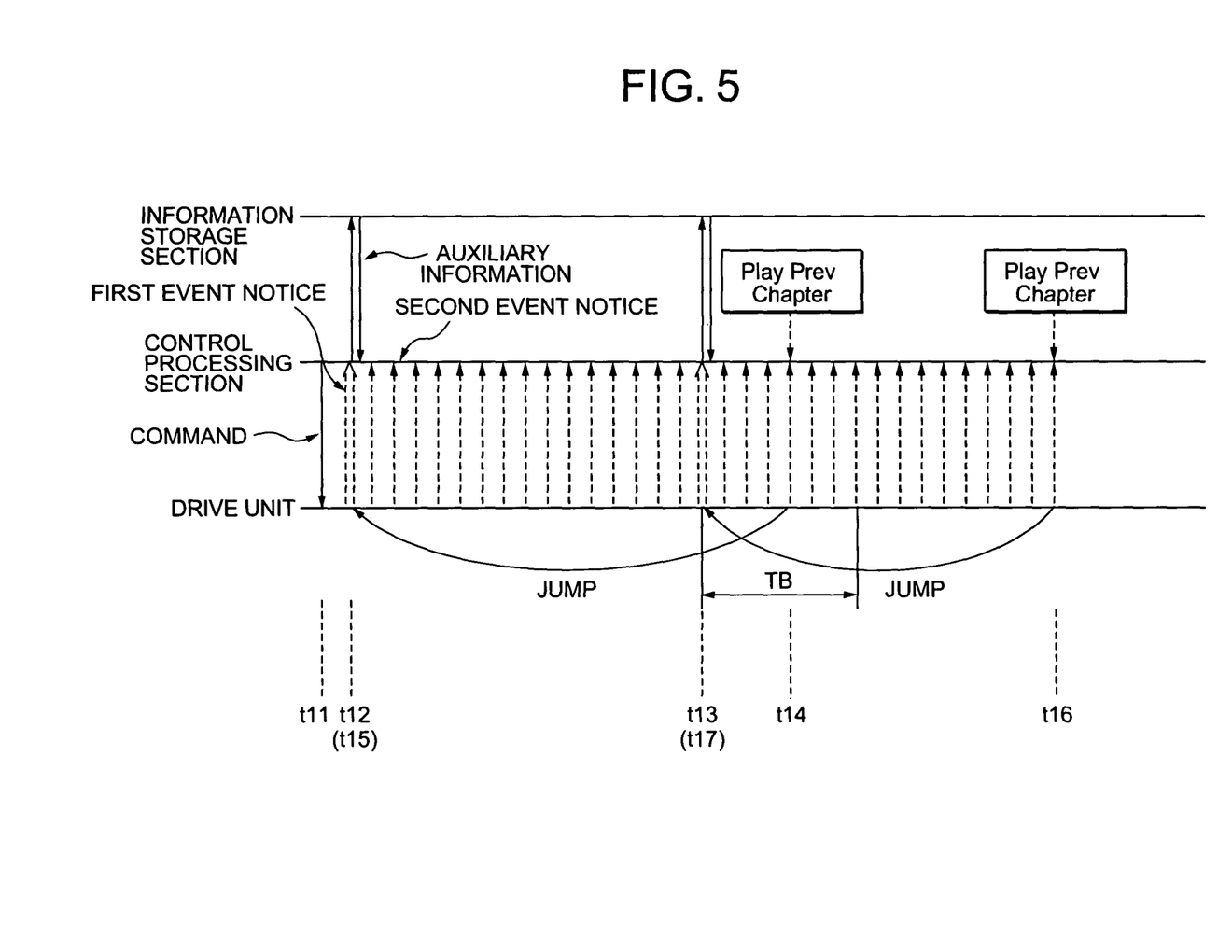
FIG. 5 is a diagram for illustrating the operation to expand the "PlayPrevChapter" command function.

FIG. 4 is a flowchart showing a process of expanding the "PlayPrevChapter" command, and FIG. 5 is a diagram for illustrating an operation thereof. In FIG. 4, steps corresponding to those of FIG. 2 are given the same reference numerals.

When the command issuing section 11 issues to the drive unit 20 the "Play" command at a time t11 of FIG. 5 as so manipulated by a user, the drive unit 20 starts reproducing a chapter 1 in a first title 1, and outputs an event notice "EC_DVD_CHAPTER_START" indicating that reproduction of the chapter 1 is started at a time t12, and also starts outputting event notices "EC_DVD_CURRENT_HMSF_TIME" indicating reproducing position information, as a result of content being reproduced.

The control processing section 11 acquires the event notice "EC_DVD_CHAPTER_START" in step ST1 and a first one of the event notices "EC_DVD_CURRENT_HMSF_TIME" in step ST2, of FIG. 4. Then, in step ST3, it generates auxiliary information by relating the chapter 1 to the reproducing position information indicating the beginning of the chapter 1, based on these event notices received in steps ST1 and ST2. In step ST4, the generated auxiliary information is stored in the information storage section 14.

Thereafter, the control processing section 11 acquires reproducing position information based on a later-supplied event notice "EC_DVD_CURRENT_HMSF_TIME" in step ST5, and then reads the auxiliary information from the information storage section 14 in step ST6.

When going to step ST10 from step ST6, the control processing section 11 determines whether or not the user has manipulated to issue the "PlayPrevChapter" command. If not, the control processing section 11 loops back to step ST1. Otherwise, it goes to step ST11. Thus, when the operation to issue the "PlayPrevChapter" command is not performed, the control processing section 11 generates new auxiliary information upon start of reproducing a chapter, for storage in the information storage section 14. For example, at a time t13 at which reproduction of a chapter 2 is started, auxiliary information is generated based on the corresponding event notices "EC_DVD_CHAPTER_START" and "EC_DVD_CURRENT_HMSF_TIME".

Then, when operation is performed to issue the "PlayPrevChapter" command at a time t14 at which the chapter 2 is being reproduced, the control processing section 11 goes to step ST11 to determine whether or not a predetermined time TB has elapsed from the beginning of the chapter being reproduced, based on the position information indicated by the read auxiliary information and reproducing position information indicated by a later-supplied event notice "EC_DVD_CURRENT_HMSF_TIME". If a value obtained by subtracting the position information indicated by the auxiliary information from the reproducing position information indicated by the later-supplied event notice is smaller than the predetermined time TB, then the control processing section 11 goes to step ST12, where it sets a parameter to a "current chapter number—1" and then goes to step ST14. In step ST14, it supplies the drive unit 20 with a "PlayChapter(parameter)" command for reproducing a chapter set by the parameter. Thus, when the "PlayPrevChapter" command is supplied before the lapse of the predetermined time TB from the beginning of the chapter 2, the reproducing position is moved back to the beginning of one chapter before, which is the chapter 1, to start reproducing the chapter 1 at a time t15.

On the other hand, when operation is performed to issue the "PlayPrevChapter" command at a time t16 at which the predetermined time TB has elapsed from the beginning of the chapter 2, the control processing section 11 goes from step ST10 to step ST11, and, knowing that the predetermined time TB has already elapsed, it further goes to step ST13 to set the parameter to a "current chapter number". In step ST14, the section 11 supplies the "PlayChapter(parameter)" command for reproducing a chapter set by the parameter, to the drive unit 20. Thus, when the "PlayPrevChapter" command is supplied after the lapse of the predetermined time TB from the beginning of the chapter 2, the reproducing position is moved back to the beginning of the chapter 2 being reproduced, to start reproducing the chapter 2 at a time t17.

In this way, when the "PlayPrevChapter" command is instructed, the jumping destination is changed according to the time elapsed from the beginning of a chapter being reproduced, whereby the function of the "PlayPrevChapter" command can be expanded.

Alternatively, the reproduction controller 10 may be implemented by a computer system. In that case, the driver section 12 is replaced with a device driver, and the reproduced signal processing section 13 with an API (Application Programming Interface) for multi-media applications. Also, the operation of the control processing section 11 is implemented by application software. In this way, if the reproduction controller 10 is implemented by a computer system, the application software is used to perform the processing shown in FIGS. 2 and 4, whereby the skip function can be performed and the functions of predetermined commands can be expanded.

In the above embodiment, the auxiliary information is generated by relating a chapter to reproducing position information related to the beginning of the chapter, based on the event notices "EC_DVD_CHAPTER_START" and "EC_DVD_CURRENT_HMSF_TIME". However, the event notice related to reproducing operation is not limited to the "EC_DVD_CHAPTER_START" notice. For example, DVD-Video standards are designed to include a maximum of 99 titles and allow each title to be divided into a maximum of 999 logical chapters. Thus, as auxiliary information indicating a relationship between a content block constituting content and its position, auxiliary information may be generated in which a title is associated to reproducing position information, based on an event notice, for example, "EC_DVD_TITLE_CHANGE" indicating that title numbers are changed. In addition, event notices related to reproducing operation, such as "EC_DVD_STILL_ON" and "EC_DVD_STILL_OFF" indicating the start and end of "still" mode may also be generated as the auxiliary information.

Furthermore, the information storage section 14 sequentially stores auxiliary information generated based on event notices related to content reproducing operation and event notices indicating reproducing position information, and thus besides the above-mentioned skip function and expanded "PlayPrevChapter" command function, a variety of reproducing operations including, for example, jumping to a desired position even some chapters before, can be performed.

Furthermore, the above embodiment discusses only reproduction of DVD-Video compatible content in detail. However, the above embodiment may also be applicable to reproduction of content recorded on other types of recording media such as optical discs and magnetic tapes, as long as these media can acquire the first event notice related to reproducing operation and the second event notices indicating reproducing position information, regarding content recorded thereon.

Although the invention having been described hereinabove in its preferred form with a certain degree of particularity, other changes, variations, combinations and sub-combinations are possible therein. It is therefore to be understood that any modifications will be practiced otherwise than as specifically described herein without departing from the scope and spirit of the present invention.

What is claimed is:

1. A reproduction controlling apparatus comprising:
  user interface receiving a selected user input of plural user inputs according to operation by a user, including at least a skip command;
  auxiliary information generation means for generating auxiliary information based on a first event notice related to reproduction operation regarding content recorded in a recording medium and a second event notice indicating reproduction position information of said recording medium;
  comparison-computation means for comparing or computing reproduction position information indicated by said auxiliary information with reproduction position information indicated by a later received second event notice to determine elapsed time of reproduction; and
  command issuing means for issuing a command for controlling the reproduction operation of said content based upon the selected user input and for automatically adjusting the reproduction operation of said content different from the command associated with the selected user input based on the result of said comparison or said computation, wherein (a) when the selected user input is the skip command and the elapsed time of reproduction of a current content block exceeds a first predetermined time after a start of reproduction of the current content block, a next content block is reproduced and (b) when the selected user input is the skip command and the elapsed time of reproduction of the current content block does not exceed the first predetermined time after the start of reproduction of the current content block, the current content block continues to be reproduced wherein content is reproduced automatically from a beginning of each content block for the first predetermined time when the user input is the skip command.

2. The reproduction controlling apparatus according to claim 1, further comprising information storage means for storing auxiliary information generated by said auxiliary information generation means;
  wherein said comparison-computation means performs comparison or calculation by utilizing reproduction position information indicated by auxiliary information read out from said information storage means.

3. The reproduction controlling apparatus according to claim 1, wherein:
  said first even notice comprises notice of start of reproduction of a content block constituting said content; and
  said auxiliary information generation means generates said auxiliary information based on a content block to be reproduced and reproduction position information at an event of reproduction of such content block.

4. The reproduction controlling apparatus according to claim 3, wherein said command issuing means changes a content block to be reproduced based on the amount of elapsed time.

5. The reproduction controlling apparatus according to claim 2, wherein said first event notice comprises notice of start of reproduction of a content block constituting said content; and said auxiliary information generation means generates said auxiliary information based on a content block to reproduced and reproduction position information at an event of reproduction of such content block.

6. The reproduction controlling apparatus according to claim 5, wherein said command issuing means changes a content block to be reproduced based on the amount of elapsed time.

7. The reproduction controlling apparatus according to claim 2, wherein, if there is an issuing operation for a command for controlling reproduction of said content, said command issuing means issues said issued command by converting or adjusting said issued command based on a result of comparison or computation by said comparison-computation means.

8. The reproduction controlling apparatus according to claim 1, wherein when the selected user input is a play previous content block command, a jump destination of the command is one of (1) a beginning of a previous content block if the amount of elapsed time from a beginning of reproduction of the current content block is less than a second predetermined time after the start of reproduction of the current content block and (2) a beginning of the current content block if the amount of elapsed time from the beginning of reproduction of the current content block is equal to or greater than the second predetermined time.

9. A reproduction controlling method comprising the steps of:
receiving a selected user input of plural user inputs according to operation by a user, including a skip command and a play previous content command;
generating auxiliary information based on a first event notice related to reproduction operation regarding content recorded in a recording medium and a second event notice indicating reproduction position information of said recording medium; and
issuing a command for controlling reproduction operation of said content based on the selected user input and for automatically adjusting the reproduction operation of said content different from the command associated with the selected user input based on a result of comparison or computation of reproduction position information indicated by said auxiliary information with reproduction position information indicated by a later received second event notice to determine elapsed time of reproduction, wherein (a) when the selected user input is the skip command and the elapsed time of reproduction of a current content block exceeds a first predetermined time after a start of reproduction of the current content block, a next content block is reproduced and (b) when the selected user input is the skip command and the elapsed time of reproduction of the current content block does not exceed the first predetermined time after the start of reproduction of the current content block, the current content block continues to be reproduced wherein content is reproduced automatically from a beginning of each content block for the first predetermined time when the user input is the skip command.

10. The reproduction controlling method according to claim 9, further comprising the step of
storing said generated auxiliary information; and
reading out said stored auxiliary information and performing comparison or calculation by utilizing reproduction position information indicated by said read out auxiliary information.

11. The reproduction controlling method according to claim 9, wherein:
said first even notice comprises notice of start of reproduction of a content block constituting said content; and
said auxiliary information generation is generated based on a content block to be reproduced and reproduction position information at an event of reproduction of such content block.

12. The reproduction controlling method according to claim 11, further comprising the step of issuing a command for changing a content block to be reproduced based upon the amount of a time elapsed.

13. The reproduction controlling method according to claim 10, wherein:
said first even notice comprises notice of start of reproduction of a content block constituting said content; and
said auxiliary information generation is generated based on a content block to be reproduced and reproduction position information at an event of reproduction of such content block.

14. The reproduction controlling method according to claim 3, further comprising the step of issuing a command for changing a content block to be reproduced based upon the amount of time elapsed.

15. The reproduction controlling method according to claim 9, wherein when the selected user input is a play previous content block command, a jump destination of the command is one of (1) a beginning of a previous content block if the amount of elapsed time from a beginning of reproduction of the current content block is less than a second predetermined time after the start of reproduction of the current content block and (2) a beginning of the current content block if the amount of elapsed time from the beginning of reproduction of the current content block is equal to or greater than the second predetermined time.

16. A non-transitory computer readable medium stored therein a computer program written in computer readable form for reproduction controlling, said program having program codes for causing a computer to execute the steps of:
receiving a selected user input of plural user inputs according to operation by a user, including a skip command and a play previous content command;
acquiring a first event notice related to reproduction operation regarding content recorded in a recording medium;
acquiring a second event notice indicating reproduction position information of said recording medium;
generating auxiliary information based on said first event notice and said second event notice; and
issuing a command for controlling reproduction operation of said content based on the selected user input and for automatically adjusting the reproduction operation of said content different from the command associated with the selected user input based on a result of comparison or computation of reproduction position information indicated by said auxiliary information with reproduction position information indicated by a later received second event notice to determine elapsed time of reproduction, wherein (a) when the selected user input is the skip command and the elapsed time of reproduction of a current content block exceeds a first predetermined time after a start of reproduction of the current content block, a next content block is reproduced and (b) when the selected user input is the skip command and the elapsed time of reproduction of the current content block does not exceed the first predetermined time after the start of reproduction of the current content block, the current content block continues to be reproduced wherein content is reproduced automatically from a beginning of each content block for the first predetermined time when the user input is the skip command.

17. The non-transitory computer medium according to claim 16, wherein when the selected user input is a play previous content block command, a jump destination of the command is one of (1) a beginning of a previous content block if the amount of elapsed time from a beginning of reproduction of the current content block is less than a second predetermined time after the start of reproduction of the current content block and (2) a beginning of the current content block if the amount of elapsed time from the beginning of reproduction of the current content block is equal to or greater than the second predetermined time.

\* \* \* \* \*